US012521000B2

United States Patent
Hirayama et al.

(10) Patent No.: US 12,521,000 B2
(45) Date of Patent: Jan. 13, 2026

(54) ENDOSCOPE

(71) Applicant: HOYA CORPORATION, Tokyo (JP)

(72) Inventors: Tetsu Hirayama, Tokyo (JP); Takahiro Kobayashi, Tokyo (JP); Naoyuki Naito, Tokyo (JP)

(73) Assignee: HOYA CORPORATION, Tokyo (JP)

(*) Notice: Subject to any disclaimer, the term of this patent is extended or adjusted under 35 U.S.C. 154(b) by 531 days.

(21) Appl. No.: 17/776,676

(22) PCT Filed: Nov. 18, 2020

(86) PCT No.: PCT/JP2020/043065
§ 371 (c)(1),
(2) Date: May 13, 2022

(87) PCT Pub. No.: WO2021/100781
PCT Pub. Date: May 27, 2021

(65) Prior Publication Data
US 2022/0395165 A1    Dec. 15, 2022

(30) Foreign Application Priority Data
Nov. 19, 2019  (JP) ................ 2019-208516

(51) Int. Cl.
*A61B 1/012*  (2006.01)
*A61B 1/005*  (2006.01)
*G02B 23/24*  (2006.01)

(52) U.S. Cl.
CPC .............. *A61B 1/012* (2013.01); *G02B 23/24* (2013.01); *A61B 1/0051* (2013.01)

(58) Field of Classification Search
CPC ............ A61B 1/00078; A61B 1/00094; A61B 1/0011; A61B 1/012; A61B 1/0125;
(Continued)

(56) References Cited

U.S. PATENT DOCUMENTS 4,732,139 A * 3/1988 Kawashima ............. A61B 1/12
600/153
5,529,820 A * 6/1996 Nomi .................... B29C 67/202
428/36.5
(Continued)

FOREIGN PATENT DOCUMENTS

CN    109688894 A    4/2019
JP    59-20142 A    2/1984
(Continued)

OTHER PUBLICATIONS

International Search Report issued in International Bureau of WIPO Patent Application No. PCT/JP2020/043065, dated Jan. 19, 2021, along with an English translation thereof.
(Continued)

*Primary Examiner* — Michael J Carey
*Assistant Examiner* — Stephen Floyd London
(74) *Attorney, Agent, or Firm* — Greenblum & Bernstein, P.L.C.

(57) ABSTRACT

The endoscope includes an insertion portion, a hand-operating unit, a first treatment-instrument conduit, and a second treatment-instrument conduit. One end of the insertion portion is coupled to the hand-operating unit. The first treatment-instrument conduit passes through insides of the insertion portion and the hand-operating unit. A treatment instrument is inserted into the first treatment-instrument conduit from an upper end of the hand-operating unit. The second treatment-instrument conduit passes through insides of the insertion portion and the hand-operating unit and includes a branching portion that branches off into a first branching path and a second branching path at the hand-operating unit, a treatment instrument is inserted into the second treatment-instrument conduit from the first branching path. The first treatment-instrument conduit includes a first part having a first hardness at least at a grip portion in
(Continued)

the hand-operating unit and a second part having a second hardness smaller than the first hardness.

8 Claims, 10 Drawing Sheets

(58) Field of Classification Search
CPC ......... A61B 1/015; A61B 1/018; A61B 1/126; A61B 1/00066; A61B 1/00119; A61B 1/00137; A61B 1/00068; A61M 25/0045; A61M 2025/0046; A61M 2025/0047; A61M 2025/0048
USPC .......................................... 600/153, 154, 156
See application file for complete search history.

(56) References Cited

U.S. PATENT DOCUMENTS

| | | | |
|---|---|---|---|
| 5,735,793 A * | 4/1998 | Takahashi | A61B 1/00128 600/153 |
| 5,971,917 A | 10/1999 | Komi et al. | |
| 2007/0255105 A1 | 11/2007 | Ochi et al. | |
| 2012/0172667 A1 | 7/2012 | Takeuchi | |
| 2013/0253268 A1 * | 9/2013 | Okada | A61B 1/07 600/104 |
| 2015/0182105 A1 * | 7/2015 | Salman | A61B 1/00137 600/104 |
| 2017/0202438 A1 * | 7/2017 | Ogi | A61B 1/0052 |
| 2017/0319175 A1 * | 11/2017 | Taniguchi | A61B 1/00082 |
| 2019/0208988 A1 | 7/2019 | Takatsuji et al. | |
| 2019/0246885 A1 * | 8/2019 | Karikomi | A61B 1/015 |
| 2020/0206458 A1 * | 7/2020 | Mullins | A61M 25/0045 |
| 2021/0219827 A1 * | 7/2021 | Ueda | A61B 1/005 |
| 2022/0022731 A1 * | 1/2022 | Takao | G02B 23/24 |

FOREIGN PATENT DOCUMENTS

| | | | |
|---|---|---|---|
| JP | S5920142 A * | 2/1984 | |
| JP | 8-215134 A | 8/1996 | |
| JP | 10-234657 A | 9/1998 | |
| JP | 10-262917 A | 10/1998 | |
| JP | 2001-46314 A | 2/2001 | |
| JP | 2001046314 A * | 2/2001 | |
| JP | 2003-88494 A | 3/2003 | |
| JP | 2007-289467 A | 11/2007 | |
| JP | 2008-54786 A | 3/2008 | |
| WO | 2012/005124 A1 | 1/2012 | |
| WO | 2016/052208 A1 | 4/2016 | |
| WO | 2018/088087 A1 | 5/2018 | |
| WO | 2019/075709 A1 | 4/2019 | |

OTHER PUBLICATIONS

European Search Report issued in EPO Patent Application No. 20888913.9, dated Oct. 19, 2023.
Office Action issued in Chinese Patent Application No. 202080078657.3, dated Oct. 21, 2024.

* cited by examiner

ENDOSCOPE

TECHNICAL FIELD

The present invention relates to an endoscope.

BACKGROUND ART

An endoscope apparatus generally includes an insertion portion to be inserted into an inside of a body (for example, a digestive organ) of a subject. The insertion portion internally includes a light guide to transmit light and an electrical wiring to transmit electrical signal from an imaging unit. In addition to them, the insertion portion internally includes an air supply/water supply conduit to supply air or supply water and a treatment-instrument conduit to insert and remove a treatment instrument, such as forceps (for example, see Patent Literatures 1 and 2).

When the flexibility of the treatment-instrument conduit is low (hard), the flexibility of the insertion portion is not sufficiently obtained and a desired operation is not obtained at the insertion portion in some cases. Conversely, when the flexibility of the treatment-instrument conduit is high at a curving portion, breakage of the conduit including buckling of the conduit and the like may be caused in the treatment-instrument conduit. The treatment-instrument conduit may come into contact with other members, and the treatment-instrument conduit may be deformed. If the deformation occurs, the inner diameter of the conduit may become small, and if the treatment instrument is moved in that state, abrasion or breakage may be caused. Patent Literatures 1 and 2 do not present a structure that allows dealing with the problems due to the contact of the treatment-instrument conduit with the other members.

CITATION LIST

Patent Literature

Patent Literature 1: JP 2001-46314 A
Patent Literature 2: WO 2018/088087

SUMMARY OF INVENTION

Technical Problem

An object of the present invention is to provide an endoscope that allows suppressing abrasion or breakage of a treatment-instrument conduit while maintaining flexibility of an insertion portion.

Solution to Problem

In order to solve the problems, an endoscope according to a first aspect of the present invention comprises an insertion portion, a hand-operating unit, a first treatment-instrument conduit, and a second treatment-instrument conduit. One end of the insertion portion is coupled to the hand-operating unit. The first treatment-instrument conduit passes through insides of the insertion portion and the hand-operating unit. A treatment instrument is inserted into the first treatment-instrument conduit from an upper end of the hand-operating unit. The second treatment-instrument conduit passes through insides of the insertion portion and the hand-operating unit and includes a branching portion that branches off into a first branching path and a second branching path at the hand-operating unit. A treatment instrument is inserted into the second treatment-instrument conduit from the first branching path. The hand-operating unit includes a grip portion for a user to grip. The first treatment-instrument conduit includes a first part having a first hardness at least at the grip portion in the hand-operating unit and a second part having a second hardness smaller than the first hardness.

In the first aspect, the hand-operating unit may include an anti-folding portion positioned between the grip portion and the insertion portion, and wherein the first treatment-instrument conduit may have the first part at least inside the anti-folding portion and the grip portion. The first treatment-instrument conduit may include the first part in a region near the branching portion. The endoscope further includes a universal cable having one end coupled to the hand-operating unit and another end coupled to a processor. The first treatment-instrument conduit may have the first part in a region near a coupling portion to the universal cable in the hand-operating unit.

Also, in the first aspect, the first treatment-instrument conduit may include an inner layer and an outer layer formed outside the inner layer. The inner layer may be formed of polytetrafluoroethylene having a first porosity. The outer layer may include a first part formed of polytetrafluoroethylene having a second porosity and a second part formed of polytetrafluoroethylene having a third porosity larger than the second porosity.

An endoscope according to a second aspect of the present invention comprises an insertion portion, a hand-operating unit, a first treatment-instrument conduit, and a second treatment-instrument conduit. One end of the insertion portion is coupled to the hand-operating unit. The first treatment-instrument conduit passes through insides of the insertion portion and the hand-operating unit. A treatment instrument is inserted into the first treatment-instrument conduit from an upper end of the hand-operating unit. The second treatment-instrument conduit passes through insides of the insertion portion and the hand-operating unit and includes a branching portion that branches off into a first branching path and a second branching path at the hand-operating unit, a treatment instrument being inserted into the second treatment-instrument conduit from the first branching path. The first treatment-instrument conduit includes a first part having a first hardness at least near the branching portion in the hand-operating unit and a second part having a second hardness smaller than the first hardness.

Advantageous Effects of Invention

According to the endoscope of the present invention, an endoscope that allows suppressing abrasion or breakage of the treatment-instrument conduit while maintaining the flexibility of the insertion portion can be provided.

DESCRIPTION OF EMBODIMENTS

In the following, embodiments of the invention will be described with reference to the attached drawings. In the attached drawings, functionally identical elements may be designated with identical numerals. While the attached drawings illustrate embodiments and implementation examples in accordance with the principle of the present disclosure, the embodiments and implementation examples are provided to aid in understanding the present disclosure and should not be interpreted as limiting the present disclosure. The descriptions provided herein are merely illustrations of typical examples and are not intended as limiting in anyway the scope of the claims of the present disclosure or application examples thereof.

The embodiments described below will be described in such sufficient detail as to enable those skilled in the art to carry out the present disclosure. However, it should be understood that other implementations and modes are also possible, and that various modifications of configurations and structures and substitutions of various elements are possible without departing from the scope and spirit of the technical concepts of the present disclosure. Accordingly, the following descriptions are not to be regarded as limiting.

First Embodiment

Figure 1:
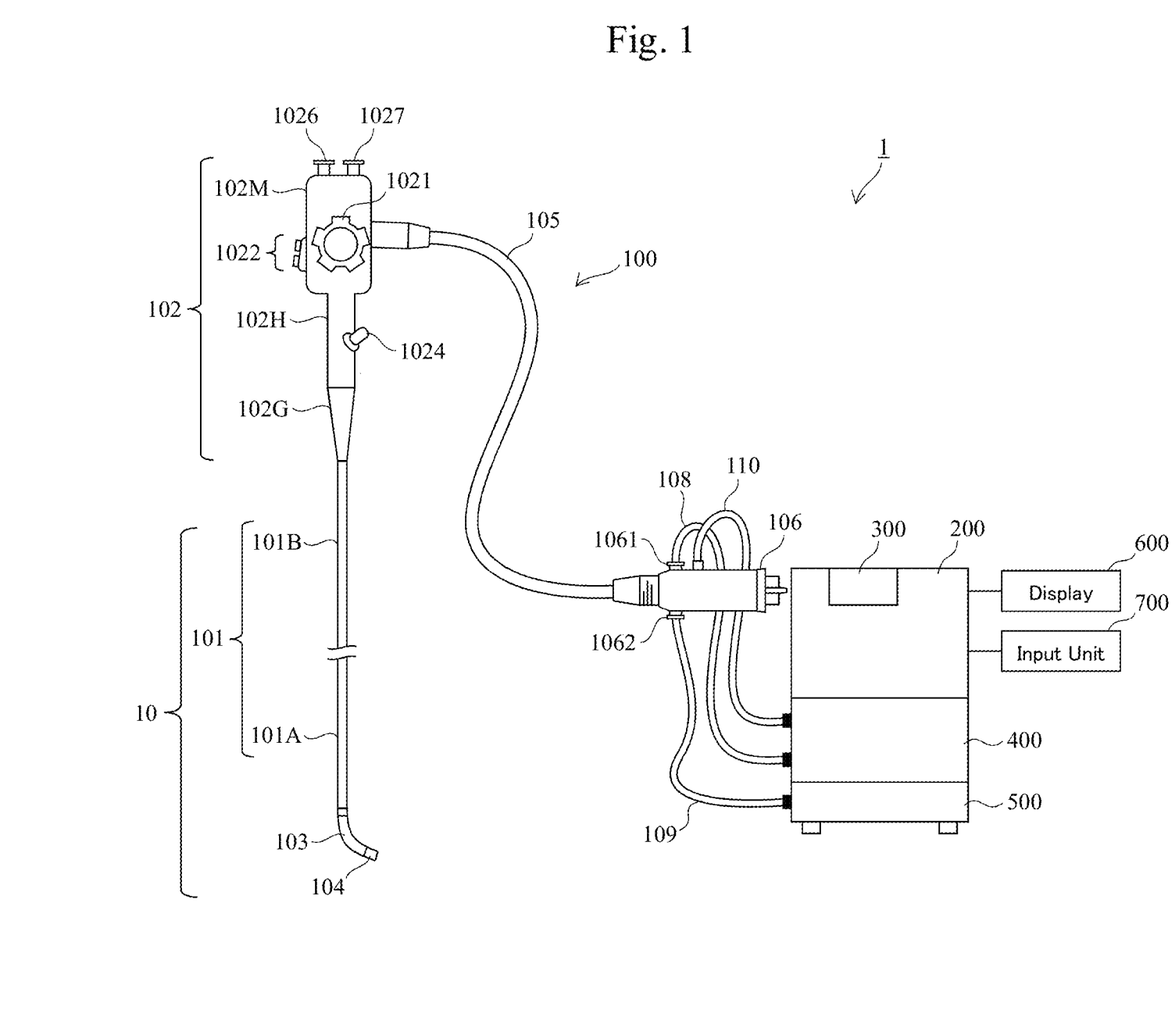
FIG. 1 is an external view of an endoscope system 1 according to a first embodiment of the present invention.
Figure 2:
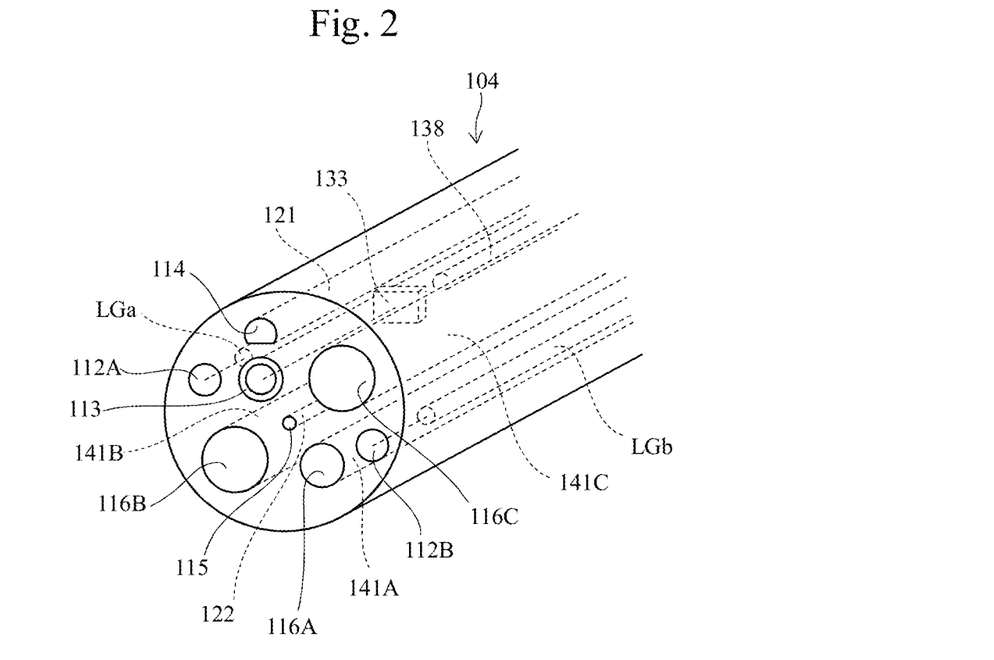
FIG. 2 is a perspective view illustrating a structure of a distal end portion 104 of an endoscope 100.

First, an endoscope system according to a first embodiment of the present invention will be described in detail. FIG. 1 is an external view of an endoscope system 1 according to the first embodiment. FIG. 2 is a perspective view describing a structure of a distal end portion 104 of an endoscope 100. The endoscope system 1 is primarily configured of the endoscope 100, a processor 200, a light source device 300, an air supply/water supply unit 400, a suction unit 500, a display 600, and an input unit 700.

The endoscope 100 is configured to be insertable into a body of a subject and has a function of capturing an image of a photographic subject and transmitting an image signal of the captured image to the processor 200. The processor 200 receives the image signal from the endoscope 100 and performs predetermined signal processing.

The light source device 300 is configured to be couplable to the processor 200 and internally includes a light source unit that emits irradiated light with which the photographic subject is irradiated. The subject is irradiated with the light from the light source unit via a light guide described later. The light source device 300 may be configured to be separated from the processor 200 and configured to be couplable to the processor 200, or may be embedded into the processor 200.

The air supply/water supply unit 400 includes an air pump to discharge a water flow or an airflow supplied to the subject. The suction unit 500 includes a pump and a tank (not illustrated) to suction a bodily fluid and a resected substance suctioned from the inside of the body of the subject via the endoscope 100.

The display 600 is a display device to perform display based on, for example, a data processing result by the processor 200. The input unit 700 is a device to input commands from an operator in various kinds of measurement operations.

The endoscope 100 includes an insertion portion 10, a hand-operating unit 102, a universal cable 105, and a connector 106. The insertion portion 10 further includes a flexible tube portion 101, a curving portion 103, and a distal end portion 104.

As illustrated in FIG. 1, the insertion portion 10 of the endoscope 100 has flexibility and includes the flexible tube portion 101 to be inserted into the body of the subject. The flexible tube portion 101 has one end coupled to the hand-operating unit 102. Besides, the hand-operating unit 102 includes, for example, a curving operation knob 1021 and an operation button 1022 operable by a user. The hand-operating unit 102 is a part to cause the operator to perform various types of operations for capturing an image by the endoscope system 1. Treatment instrument insertion ports 1024, 1026, and 1027 to insert treatment instruments are provided to the hand-operating unit 102.

In the flexible tube portion 101, a part close to the curving portion 103 is a first flexible tube portion 101A and a part close to the hand-operating unit 102 is a second flexible tube portion 101B. While the curving portion 103 is configured to be actively changeable in shape by the operation of the operator of the curving operation knob 1021, the first flexible tube portion 101A is a part that passively changes in shape by an external force unrelated to the operation of the curving operation knob 1021, for example an external force generated by the distal end portion 104 and the curving portion 103 coming into contact with a wall surface of a digestive organ. Although the same applies to the second flexible tube portion 101B, the second flexible tube portion 101B has a small degree of change in shape compared with the first flexible tube portion 101A (the minimum curvature radius is large). In the example of FIG. 1, while the flexible tube portion 101 has two types of flexible tube portions, the flexible tube portion 101 is not limited to this. Three types or more flexible tube portions may be included, or one type may be included.

The curving portion 103 (active curving portion) configured to be curved is disposed at the distal end of the flexible tube portion 101. As described above, pulling an operation wire (not illustrated in FIG. 1) in conjunction with a rotating operation of the curving operation knob 1021 disposed on the hand-operating unit 102 curves the curving portion 103. Between the curving portion 103 and the first flexible tube portion 101A, a coupling portion that does not deform by a curving wire W or an external force may be disposed.

Further, the distal end portion 104 that includes an imaging device (an imaging unit) is joined to the distal end of the curving portion 103. The direction of the distal end portion 104 changes according to the curving operation of the curving portion 103 by the rotating operation of the curving operation knob 1021, thus allowing change of the photographed area by the endoscope 100.

The hand-operating unit 102 includes a main body portion 102M, a grip portion 102H, and an anti-folding portion 102G. The main body portion 102M is a part having the above-described curving operation knob 1021 and the operation button 1022. The grip portion 102H is a part configured to be grippable by the operator. In order for the operator to easily grip, the width of the grip portion 102H is made smaller than that of the main body portion 102M. The anti-folding portion 102G is formed at a coupling portion between the insertion portion 10 and the hand-operating unit 102 and is disposed for suppressing bending of the insertion portion 10.

The universal cable 105 extends from the opposite side of the hand-operating unit 102 to the connector 106. Similarly to the insertion portion 10, the universal cable 105 internally includes a light guide, various types of wirings, and various types of conduits. The universal cable 105 has one end coupled to the hand-operating unit 102 and the other end coupled to the connector 106.

The connector 106 includes various types of connectors for coupling the endoscope 100 to the processor 200. The connector 106 includes an air supply/water supply conduit 108 as a passage to transmit a water flow and an airflow to the insertion portion 10. The air supply/water supply conduit 108 is coupled to the universal cable 105 via an airflow/water flow port 1061. The connector 106 includes a suction conduit 109 to suction a bodily fluid and a resected substance suctioned from the inside of the body of the subject via the endoscope 100 and discharge them to the suction unit 500.

With reference to FIG. 2, a structure of the distal end portion 104 of the endoscope 100 will be described. Light distribution lenses 112A and 112B are arranged at the distal end portion 104 of the endoscope 100. Light guides LGa and LGb extend across inside of the insertion portion 10 from the distal end portion 104 to the connector 106. The light from the light source unit of the light source device 300 is guided by the light guides LGa and LGb, and the subject is irradiated with the light by the light distribution lenses 112A and 112B arranged at the distal end portion 104.

As illustrated in FIG. 2, the endoscope 100 includes an objective lens 113 and an imaging device 133 in the distal end portion 104. The objective lens 113 disposed in the distal end portion 104 condenses scattered light and reflected light from the subject to form an image of the subject on a photo-receiving surface of the imaging device 133.

As one example, the imaging device 133 can be constituted of a Charge Coupled Device (CCD) or a Complementary Metal Oxide Semiconductor Sensor (a CMOS sensor). The imaging device 133 is controlled by a signal (such as a gain control signal, an exposure control signal, and a shutter speed control signal) supplied from the processor 200 via an electrical wiring 138 and supplies an image signal of the captured image to the processor 200 via the electrical wiring 138 and an A/D converter circuit (not illustrated).

An air supply/water supply port 114, an auxiliary water supply port 115, and treatment instrument ports 116A to 116C are provided as end portions or openings of the various types of conduits in the end surface of the distal end portion 104. The air supply/water supply port 114 is coupled to an air supply/water supply conduit 121 to introduce the water flow or the airflow for, for example, cleaning the distal end portion 104.

The auxiliary water supply port 115 is coupled to an auxiliary water supply conduit 122 to introduce auxiliary supply water to remove excrement within the visual field. The conduits 121 to 122 are disposed so as to extend along inside the distal end portion 104, the curving portion 103, the insertion portion 10, the hand-operating unit 102, and the universal cable 105.

In addition to the conduits 121 to 122, the endoscope 100 internally includes treatment-instrument conduits 141A to 141C. Treatment instruments, such as forceps, are disposed inside the treatment-instrument conduits 141A to 141C to freely advance and retreat. Distal ends of the treatment-instrument conduits 141A to 141C constitute the treatment instrument ports 116A to 116C in the distal end portion 104. In the first embodiment, as one example, the treatment-instrument conduit 141A includes a branching portion that is branched into a first branching portion and a second branching portion. One is used for insertion of a treatment instrument and the other is used as a suction conduit to a suction unit.

Figure 3:
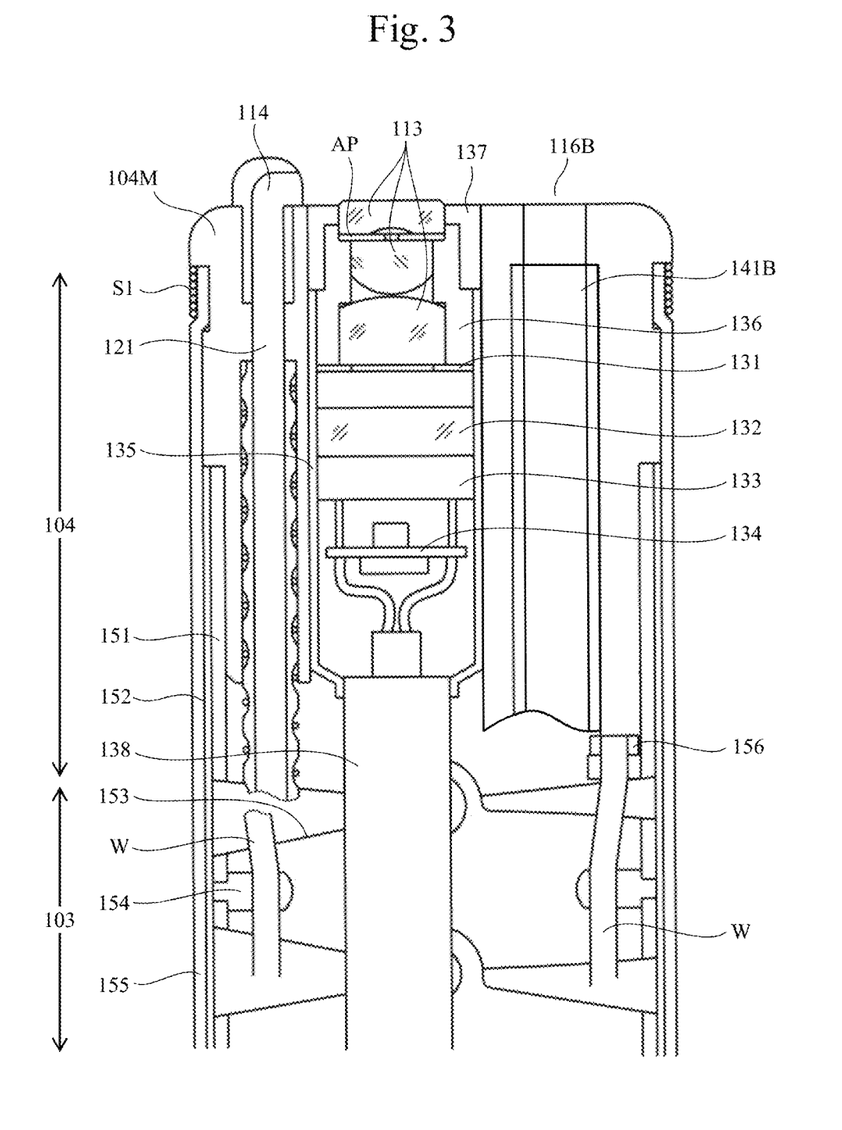
FIG. 3 is a cross-sectional view describing a cross-sectional structure of the distal end portion 104 in more detail.

With reference to FIG. 3, a cross-sectional structure of the distal end portion 104 will be described in more detail. The cross-sectional view illustrates the details of structures of the objective lens 113 to the electrical wiring 138, the air supply/water supply conduit 121, and the treatment-instrument conduit 141B. The treatment-instrument conduits 141A and 141C are not illustrated in the drawing. The structures of the light distribution lenses 112A and 112B and the light guides LGa and LGb are also not illustrated in the drawing. The structure of the auxiliary water supply conduit 122 is also not illustrated in the drawing.

The distal end portion 104 has a rigid distal end portion 104M. The rigid distal end portion 104M includes hole portions constituting the above-described air supply/water supply port 114, auxiliary water supply port 115, and treatment instrument port 116B. As illustrated in FIG. 3, the air supply/water supply conduit 121 and the treatment-instrument conduit 141B are inserted into the corresponding hole portions of the rigid distal end portion 104M.

The rigid distal end portion 104M also has a hole portion for fitting a lens frame 136 that holds the objective lens 113, a diaphragm AP, and a light shielding mask 131. The lens frame 136 is fixed to the hole portion of the rigid distal end portion 104M via a sealing agent 137.

On the other hand, as one example, the light shielding mask 131, a cover glass 132, the imaging device (CCD) 133, and a circuit board 134 are held onto the rear of the objective lens 113 by a CCD unit frame 135, and the CCD unit frame 135 is inserted into and secured to the hole portion of the rigid distal end portion 104M. The electrical wiring 138 is coupled to the circuit board 134.

The distal end portion 104 (rigid distal end portion 104M) configured as described above is fitted into the distal end of the curving portion 103. The curving portion 103 is configured to mutually turnably couple to curving pieces 153 formed in an approximately cylindrical shape with rivets. The outer surfaces of the curving pieces 153 are coated with a netlike pipe 152. The netlike pipe 152 is joined to the rigid distal end portion 104M at the end portion of the netlike pipe 152 via a ring contact pipe 151. The outer surface of the netlike pipe 152 is covered with an envelope rubber tube 155 made of synthetic resin. The envelope rubber tube 155 and the rigid distal end portion 104M are secured at the end portions of the envelope rubber tube 155 and the rigid distal end portion 104M by, for example, a securing thread S1.

A wire guide 154 is disposed between the plurality of curving pieces 153, and the curving wire W for a curving operation passes through the wire guide 154. For example, four curving wires W are disposed in one insertion portion 10 at approximately regular intervals in a circumferential direction. Each of the curving wires W has one end of secured to the curving piece 153 at the foremost portion. The other end of the curving wire W is tensioned and relaxed by the operation of the curving operation knob 1021, thus curving the curving portion 103.

Figure 4:
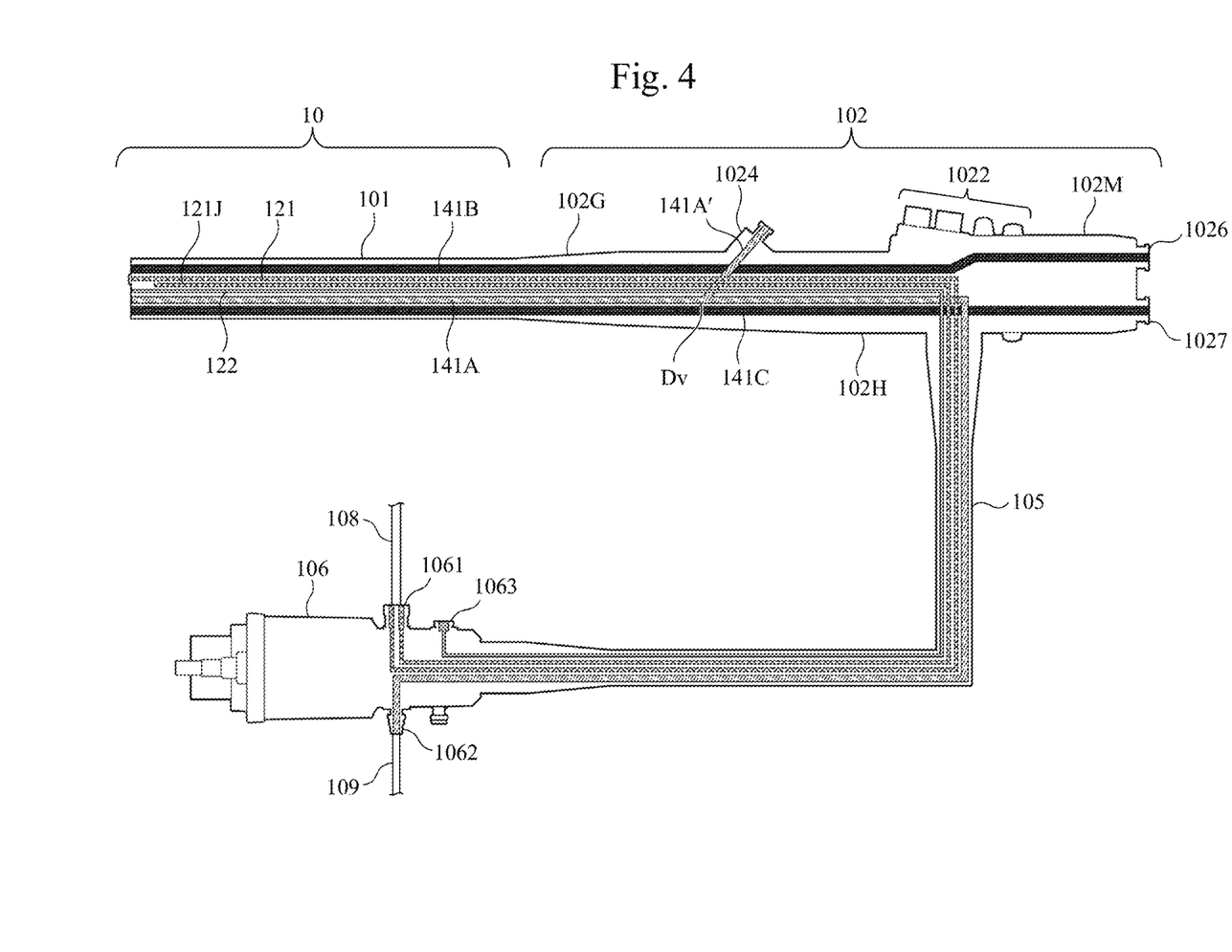
FIG. 4 is a schematic diagram illustrating an arrangement of various types of conduits in an insertion portion 10, a hand-operating unit 102, a universal cable 105, and a connector 106.

Next, with reference to FIG. 4, an arrangement of the various types of conduits in the insertion portion 10, the hand-operating unit 102, the universal cable 105, and the connector 106 is illustrated. As described above, the air supply/water supply conduit 121, the auxiliary water supply conduit 122, and the treatment-instrument conduits 141A to 141C are arranged in the insertion portion 10.

The air supply/water supply conduit 121 branches off from an air conduit 121J in mid-course. The air conduit 121J and the air supply/water supply conduit 121 pass through the insides of the insertion portion 10, the hand-operating unit 102, and the universal cable 105, and are coupled to the airflow/water flow port 1061 in the connector 106. The airflow/water flow port 1061 is coupled to the above-described air supply/water supply conduit 108. Similarly, the auxiliary water supply conduit 122 is arranged so as to pass through the insides of the insertion portion 10, the hand-operating unit 102, and the universal cable 105, and reach an auxiliary water supply port 1063 of the connector 106.

The treatment-instrument conduit 141A (first treatment-instrument conduit) is arranged so as to extend inside the insertion portion 10. However, the treatment-instrument conduit 141A has a branching portion Dv at a position of the treatment instrument insertion port 1024 of the hand-operating unit 102 and branches off from a branching path 141A' (first branching path). The branching path 141A' is coupled to the treatment instrument insertion port 1024 and functions as a conduit for inserting a treatment instrument. The treatment-instrument conduit 141A (second branching path) further extends to the hand-operating unit 102, the universal cable 105, and the connector 106, and is coupled to a suction port 1062. The above-described suction conduit 109 is coupled to the suction port 1062. Thus, the treatment-instrument conduit 141A doubles as a conduit for insertion of a treatment instrument and a conduit for suction.

On the other hand, the treatment-instrument conduits 141B and 141C (second treatment-instrument conduits) extend inside the insertion portion 10, but do not extend in the direction of the universal cable 105. The treatment-instrument conduits 141B and 141C are arranged so as to extend to the upper end of the hand-operating unit 102 and reach the treatment instrument insertion ports 1026 and 1027.

As is evident from FIG. 4, the various types of conduits are densely arranged inside the hand-operating unit 102, especially in the proximity of the branching portion Dv. In order for the operator to easily grip, the grip portion 102H of the hand-operating unit 102 has a diameter (width) that is made small compared with that of the main body portion 102M. The same applies to the anti-folding portion 102G that couples the grip portion 102H to the insertion portion 10. In view of this, inside the hand-operating unit 102, especially in the proximity of the grip portion 102H and the anti-folding portion 102G, contact between the conduits or contact between the conduits and structural members of the operating unit is likely to occur.

Figure 5:
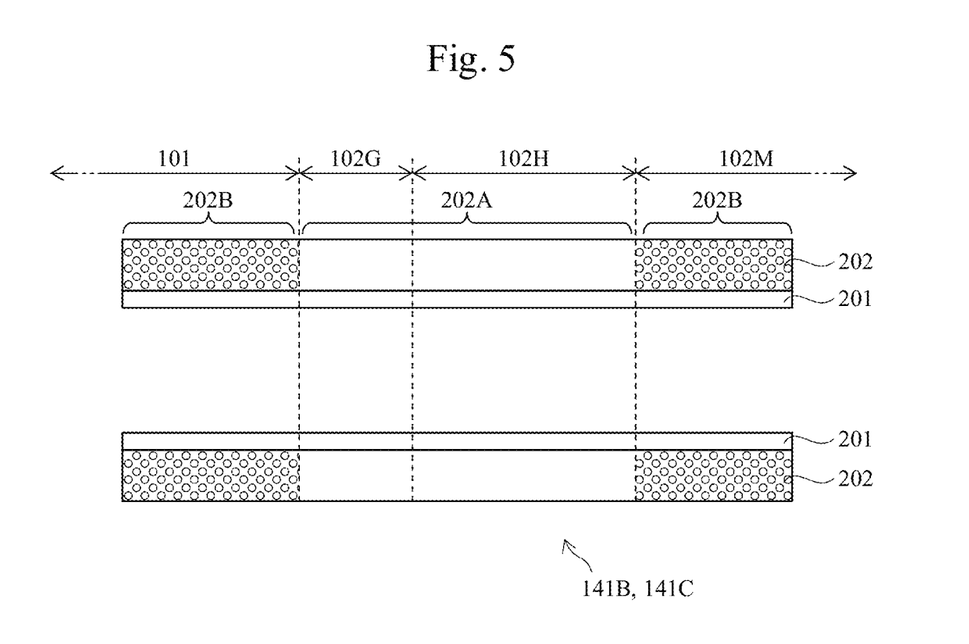
FIG. 5 is a cross-sectional view describing a structure of treatment-instrument conduits 141B and 141C according to the first embodiment.

Therefore, in the first embodiment, for the treatment-instrument conduits 141B and 141C, a structure illustrated in FIG. 5 is employed. The treatment-instrument conduits 141B and 141C include a two-layer structure having an inner layer 201 and an outer layer 202 arranged outside with respect to the inner layer 201. In order to suppress breakage caused by coming into contact with a treatment instrument passing through the conduit, the inner layer 201 is configured of polytetrafluoroethylene (PTFE) having a solid structure (in which a porosity (first porosity) is approximately zero) over the whole length (the distal end portion 104 to the hand-operating unit 102). Instead of having a solid structure, PTFE having a porous structure that has a considerably small porosity to the extent that a sufficient hardness is obtained may be used.

On the other hand, in the outer layer 202, a first part 202A positioned at the grip portion 102H and the anti-folding portion 102G is configured of PTFE having a solid structure (in which a porosity (second porosity) is approximately zero) as a material. A remaining second part 202B is configured of PTFE having a porous structure (having a third porosity larger than the second porosity) as a material. In other words, at the grip portion 102H and the anti-folding portion 102G, both the inner layer 201 and the outer layer 202 are configured of the PTFE having a solid structure. Instead of having a solid structure, PTFE having a porous structure that has a considerably small porosity to the extent that a sufficient hardness is obtained may be used.

The treatment-instrument conduits 141B and 141C are configured in the two-layer structure of the PTFE having a solid structure and the PTFE having a porous structure, thus allowing both resistance against breakage caused by the insertion of a treatment instrument and buckling resistance. In other words, by holding the PTFE having a solid structure of the inner layer 201 by the porous PTFE of the outer layer 202 that is less likely to buckle, the conduits can be configured to be flexible and less likely to buckle. On the other hand, at the grip portion 102H and the anti-folding portion 102G, both the inner layer 201 and the outer layer 202 are configured of the PTFE having a solid structure. This allows the treatment-instrument conduits 141B and 141C to have a first part having a first hardness at the grip portion 102H and the anti-folding portion 102G that are a part of the hand-operating unit 102 and include a second part having a second hardness smaller than the first hardness at a part other than the part of the hand-operating unit 102. Both the inner layer 201 and the outer layer 202 may be configured of the PTFE having a solid structure only at the grip portion 102H.

Figure 6A:
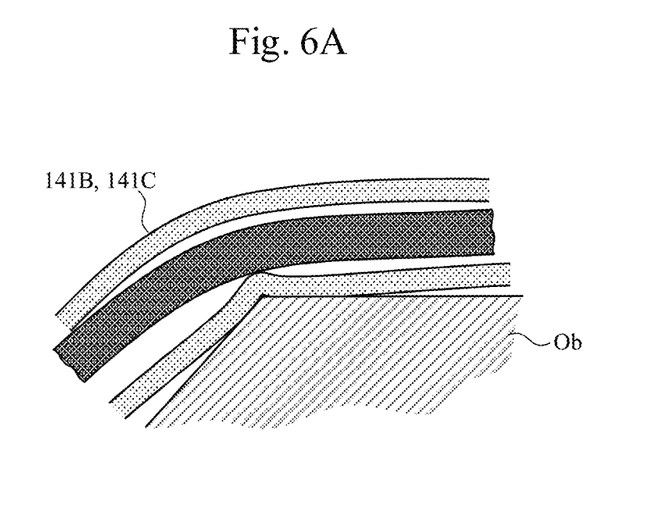
FIG. 6A and FIG. 6B are conceptual diagrams describing effects according to the first embodiment.
Figure 6B:
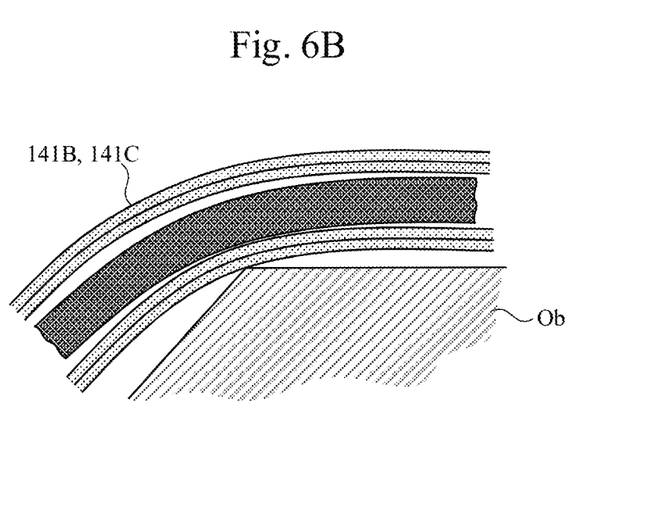

When flexibility of the treatment-instrument conduits 141B and 141C is high, as illustrated in FIG. 6A, other constituting members (reference numeral Ob) in the grip portion 102H and the anti-folding portion 102G come into contact with the treatment-instrument conduits 141B and 141C, thereby possibly causing deformation in the treatment-instrument conduits 141B and 141C. The deformation may cause abrasion or breakage of the treatment-instrument conduits 141B and 141C.

In contrast to this, in the first embodiment, as described above, the treatment-instrument conduits 141B and 141C have both the inner layer 201 and the outer layer 202 configured of the PTFE having a solid structure at the grip portion 102H and the anti-folding portion 102G that are a part of the hand-operating unit 102. In view of this, even when the other constituting members in the grip portion 102H and the anti-folding portion 102G come into contact with the treatment-instrument conduits 141B and 141C, the treatment-instrument conduits 141B and 141C do not easily deform. Accordingly, with the embodiment, the conduits that is flexible and less likely to buckle while suppressing abrasion or breakage of the treatment-instrument conduits 141B and 141C in a dense part can be formed.

Figure 7:
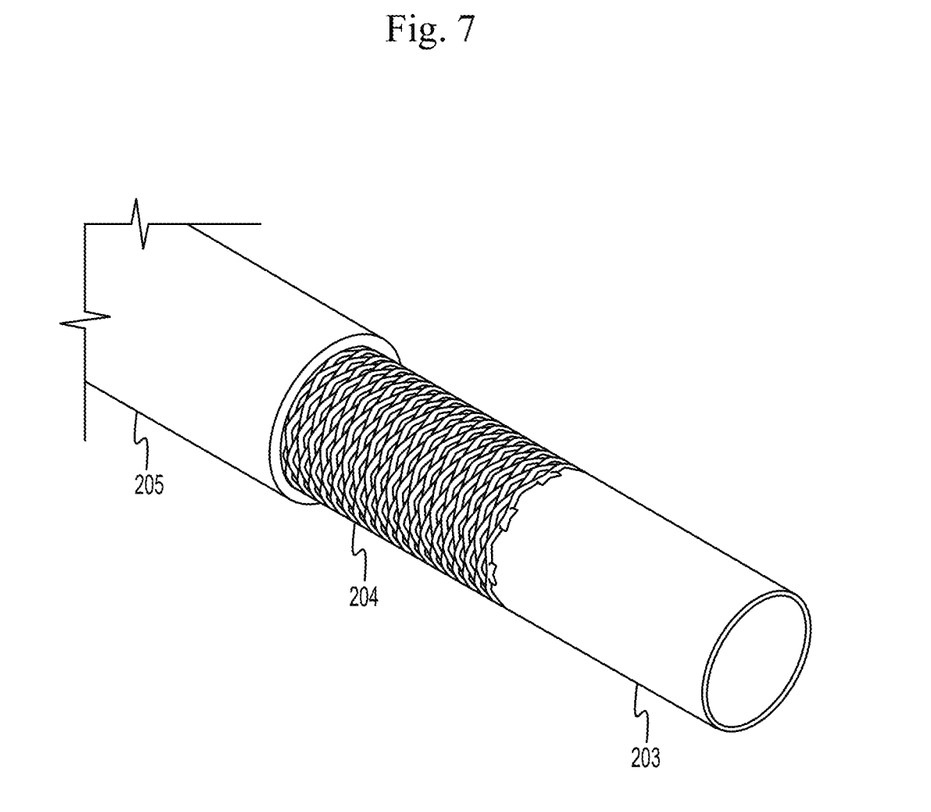
FIG. 7 is a drawing describing a modification according to the first embodiment.

In the example illustrated above, by varying the porosity in the PTFE of the two-layer structure of the inner layer 201 and the outer layer 202 constituting the treatment-instrument conduits 141B and 141C, the treatment-instrument conduits having different hardness depending on a position are provided. However, a structure providing the first part having the first hardness and the second part having the second hardness smaller than the first hardness is not limited to the one illustrated. For example, a different hardness can be provided by arranging a part reinforced with a heat shrinkable tube and a reinforcing coil and a part not reinforced. The treatment-instrument conduits 141B and 141C can be configured by a braided tube as illustrated in FIG. 7. The braided tube includes, for example, an inner layer 203 made of fluorine-based resin, such as PTFE, a metal braid 204 (such as stainless steel) wound around the outside of the inner layer, and an outer layer 205 made of soft resin, such as urethane, on the outside of the metal braid 204. By varying a density of metal wires in the metal braid 204 depending on a position, a different hardness can be provided. The modification can be employed in a second to a fourth embodiments below.

Second Embodiment

Next, an endoscope according to the second embodiment will be described with reference to FIG. 8 and FIG. 9. The overall configuration of the endoscope of the second embodiment is similar to that of the first embodiment (FIG. 1). The configurations of the distal end portion 104, the curving portion 103, and the insertion portion 10, and the arrangement of the various types of conduits are also similar to those of the first embodiment (FIG. 2 to FIG. 4).

Figure 8:
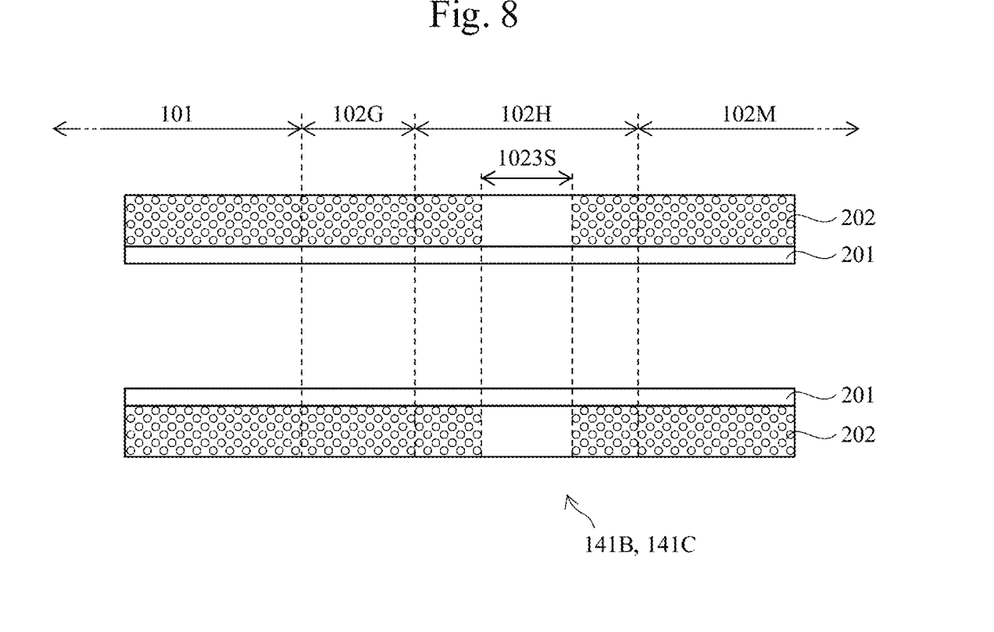
FIG. 8 is a schematic diagram describing a structure according to a second embodiment.
Figure 9:
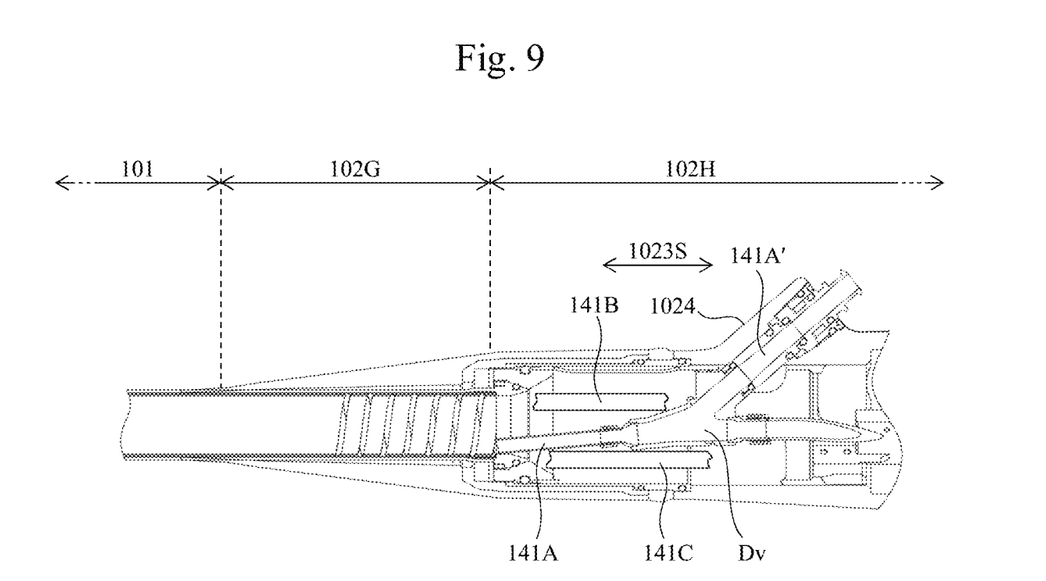
FIG. 9 is a schematic diagram describing the structure according to the second embodiment.

The second embodiment differs from the first embodiment in the structure of the treatment-instrument conduits 141B and 141C as illustrated in FIG. 8. In the embodiment, the part in which both the inner layers 201 and the outer layer 202 are configured of the PTFE having a solid structure is set to a region 1023S near the branching portion Dv in the hand-operating unit 102.

As described above, in the region 1023S near the branching portion Dv, the various types of conduits are especially concentrated and extend in different directions. In view of this, contact between the conduits is especially likely to occur. For example, the branching portion Dv is usually configured of a hard member, such as stainless steel. At a position in which the various types of conduits are densely concentrated, the treatment-instrument conduits 141B and 141C passing outside the hard branching portion Dv are likely to be deformed as illustrated in FIG. 6A. In view of this, in the second embodiment, in the region 1023S, both the inner layer 201 and the outer layer 202 of the treatment-instrument conduits 141B and 141C are configured of the PTFE having a solid structure. Accordingly, with the second embodiment, the conduits that is flexible and less likely to buckle while suppressing abrasion or breakage of the treatment-instrument conduits 141B and 141C in a dense part can be formed.

Third Embodiment

Next, an endoscope according to the third embodiment will be described with reference to FIG. 10 and FIG. 11. The overall configuration of the endoscope of the third embodiment is similar to that of the first embodiment (FIG. 1). The configurations of the distal end portion 104, the curving portion 103, and the insertion portion 10, and the arrangement of the various types of conduits are also similar to those of the first embodiment (FIG. 2 to FIG. 4).

Figure 10:
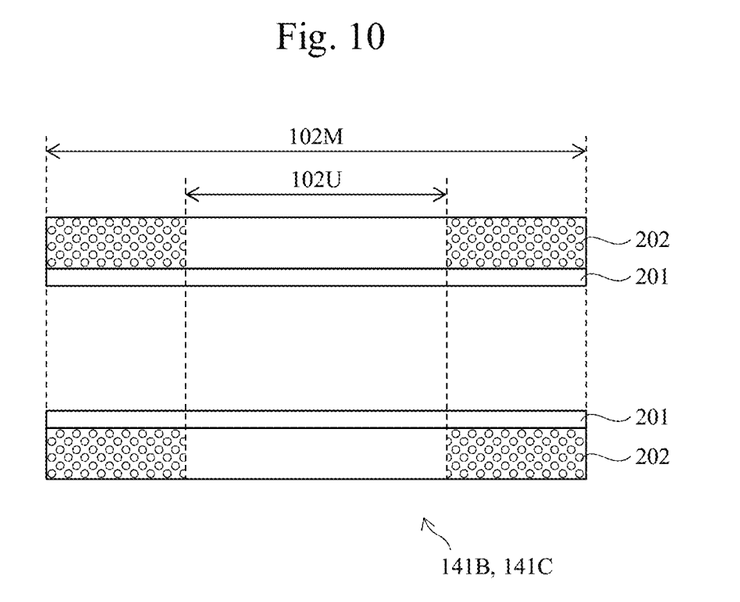
FIG. 10 is a schematic diagram describing a structure according to a third embodiment.

The third embodiment differs from the first embodiment in the structure of the treatment-instrument conduits 141B and 141C as illustrated in FIG. 10. In the third embodiment, the part in which both the inner layers 201 and outer layer 202 are configured of the PTFE having a solid structure is set to a region 102U in the proximity of the coupling portion of the universal cable 105 in the hand-operating unit 102.

Figure 11:
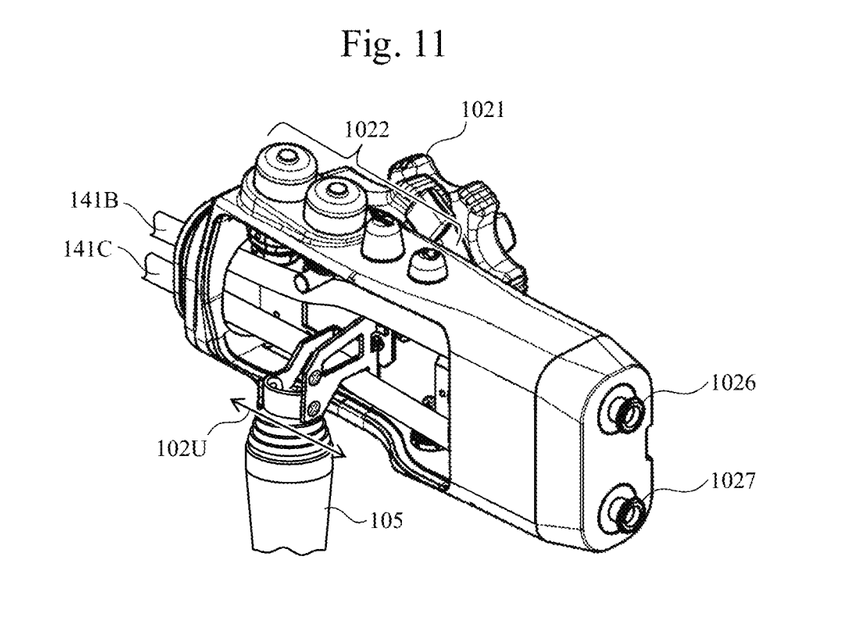
FIG. 11 is a schematic diagram describing the structure according to the third embodiment.

As illustrated in FIG. 11, in the region 102U (inside the main body portion 102M) in the proximity of the coupling portion of the universal cable 105, the various types of conduits that extend to the universal cable 105 are concentrated and bended approximately perpendicularly. In view of this, contact between the conduits is especially likely to occur. In view of this, in the third embodiment, in the region 102U, both the inner layer 201 and the outer layer 202 of the treatment-instrument conduits 141B and 141C are configured of the PTFE having a solid structure. Accordingly, with the third embodiment, the conduits that is flexible and less likely to buckle while suppressing abrasion or breakage of the treatment-instrument conduits 141B and 141C in a dense part can be formed. Although not illustrated in the drawing, in the third embodiment, the inner layer 201 and the outer layer 202 of the treatment-instrument conduits 141B and 141C at the grip portion 102H and the anti-folding portion 102G may be configured similarly to those of the second embodiment.

Fourth Embodiment

Next, an endoscope according to the fourth embodiment will be described with reference to FIG. 12. The overall configuration of the endoscope of the fourth embodiment is similar to that of the first embodiment (FIG. 1). The configurations of the distal end portion 104, the curving portion 103, and the insertion portion 10, and the arrangement of the various types of conduits are also similar to those of the first embodiment (FIG. 2 to FIG. 4).

Figure 12:
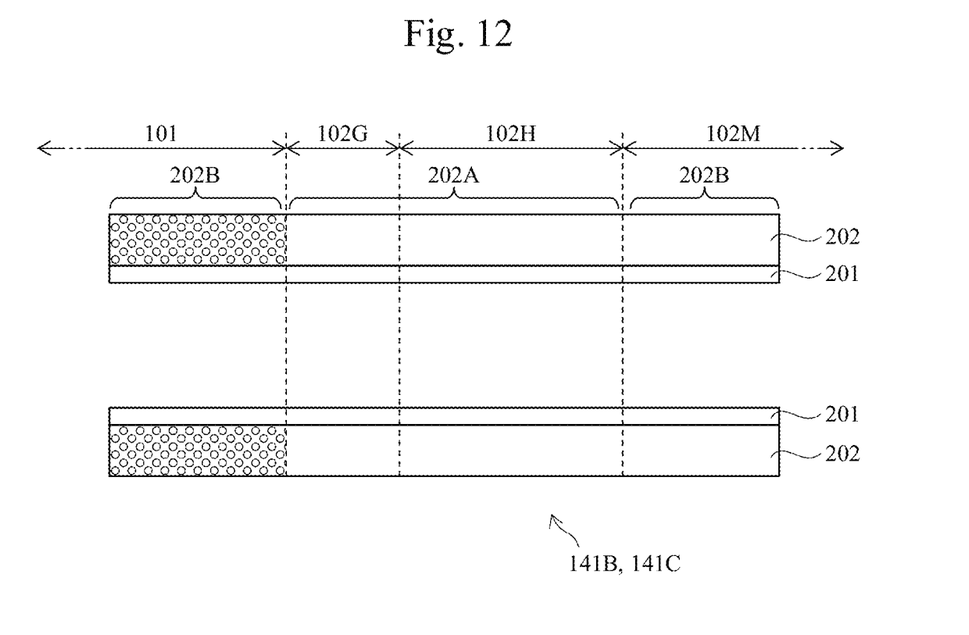
FIG. 12 is a schematic diagram describing a structure according to a fourth embodiment.

The fourth embodiment differs from the first embodiment in the structure of the treatment-instrument conduits 141B and 141C as illustrated in FIG. 12. In the fourth embodiment, the part (first part) in which both the inner layer 201 and the outer layer 202 are configured of the PTFE having a solid structure is set to a whole including the anti-folding portion 102G in the hand-operating unit 102. In other words, the part (second part) in which the outer layer 202 is configured by a porous structure only lies in the insertion portion 10, and in the hand-operating unit 102 with the anti-folding portion 102G and the main body portion 102M included, both the inner layer 201 and the outer layer 202 are configured of the PTFE having a solid structure as a whole.

With the fourth embodiment, the effects similar to those of the above-described embodiments can be obtained. In the fourth embodiment, only the outer layer 202 in the insertion portion 10 is configured of the PTFE having a porous structure, and in the hand-operating unit 102, as a whole, both the inner layer 201 and the outer layer 202 can be configured of the PTFE having a solid structure. The structure of the treatment-instrument conduits 141B and 141C is simplified, and fabrication of the treatment-instrument conduits 141B and 141C can be facilitated.

Others

The present invention is not limited to the above-described embodiments, and includes various modifications. For example, the above-described embodiments are described in detail for ease of understanding of the present invention, and does not necessarily include all of the described configurations. A part of the configuration of one embodiment can be replaced by the configuration of another embodiment. The configuration of another embodiment can be added to the configuration of one embodiment. Addition, deletion, or replacement of another configuration can be performed on a part of the configuration in each of the embodiments.

REFERENCE SIGNS LIST

1 Endoscope system
100 Endoscope
10 Insertion portion
101 Flexible tube portion
101A First flexible tube portion
101B Second flexible tube portion
102 Hand-operating unit
1021 Curving operation knob
1022 Operation button
1024, 1026, 1027 Treatment instrument insertion port
102G Anti-folding portion
102H Grip portion
102M Main body portion
103 Curving portion
104 Distal end portion
105 Universal cable
106 Connector
108 Air supply/water supply conduit
109 Suction conduit
LGa, LGb Light guide
112A, 112B Light distribution lens
113 Objective lens
114 Air supply/water supply port
115 Auxiliary water supply port
116A to 116C Treatment instrument port
121 Air supply/water supply conduit
122 Auxiliary water supply conduit
141A to 141C Treatment-instrument conduit
133 Imaging device
134 Circuit board
135 CCD unit frame
136 Lens frame
137 Sealing agent
138 Electrical wiring
200 Processor
201 Inner layer
202 Outer layer
203 Inner layer
204 Metal braid
205 Outer layer
300 Light source device
400 Air supply/water supply unit
500 Suction unit
600 Display
700 Input unit

The invention claimed is:

1. An endoscope comprising:
an insertion portion;
a hand-operating unit to which one end of the insertion portion is coupled;
a first treatment-instrument conduit passing through insides of the insertion portion and the hand-operating unit, a first treatment instrument being insertable into the first treatment-instrument conduit from an upper end of the hand-operating unit and through an entire length of the first treatment-instrument conduit; and
a second treatment-instrument conduit configured to provide suction and passing through insides of the insertion portion, the hand-operating unit and a connector configured to connect to a processor, the second treatment-instrument conduit including a branching portion that branches off into a first branching path and a second branching path at the hand-operating unit, a second treatment instrument being inserted into the second treatment-instrument conduit from the first branching path,
wherein the hand-operating unit includes a grip portion for a user to grip, and
wherein the first treatment-instrument conduit includes:
a first part having a first hardness at least at the branching portion and the grip portion in the hand-operating unit; and
a second part having a second hardness smaller than the first hardness.

2. The endoscope according to claim 1,
wherein the hand-operating unit includes an anti-folding portion positioned between the grip portion and the insertion portion, and
wherein the first treatment-instrument conduit has the first part at least inside the anti-folding portion and the grip portion.

3. The endoscope according to claim 1, further comprising
a universal cable having one end coupled to the hand-operating unit and another end coupled to the connector,
wherein the first treatment-instrument conduit has the first part in a region near a coupling portion to the universal cable in the hand-operating unit.

4. The endoscope according to claim 1,
wherein the first treatment-instrument conduit includes:
an inner layer; and
an outer layer formed outside the inner layer,
wherein the inner layer is formed of polytetrafluoroethylene having a first porosity, and
wherein the outer layer includes a first part formed of polytetrafluoroethylene having a second porosity and a second part formed of polytetrafluoroethylene having a third porosity larger than the second porosity.

5. The endoscope according to claim 1,
wherein the first treatment-instrument conduit has the second part only in the insertion portion.

6. An endoscope comprising:
an insertion portion;
a hand-operating unit to which one end of the insertion portion is coupled;
a first treatment-instrument conduit passing through insides of the insertion portion and the hand-operating unit, a first treatment instrument being insertable into the first treatment-instrument conduit from an upper end of the hand-operating unit and through an entire length of the first treatment-instrument conduit; and
a second treatment-instrument conduit configured to provide suction and passing through insides of the insertion portion, the hand-operating unit and a connector configured to connect to a processor, the second treatment-instrument conduit including a branching portion that branches off into a first branching path and a second branching path at the hand-operating unit, a second treatment instrument being inserted into the second treatment-instrument conduit from the first branching path, wherein the first treatment-instrument conduit includes:
a first part having a first hardness at least at the branching portion in the hand-operating unit; and
a second part having a second hardness smaller than the first hardness.

7. The endoscope according to claim 6, further comprising
a universal cable having one end coupled to the hand-operating unit and another end coupled to the connector,
wherein the first treatment-instrument conduit has the first part in a region near a coupling portion to the universal cable in the hand-operating unit.

8. The endoscope according to claim 6,
wherein the first treatment-instrument conduit includes:
an inner layer; and
an outer layer formed outside the inner layer,
wherein the inner layer is formed of polytetrafluoroethylene having a first porosity, and
wherein the outer layer includes a first part formed of polytetrafluoroethylene having a second porosity and a second part formed of polytetrafluoroethylene having a third porosity larger than the second porosity.

\* \* \* \* \*